United States Patent
Ogasawara

(10) Patent No.: US 9,551,875 B2
(45) Date of Patent: Jan. 24, 2017

(54) HEADUP DISPLAY DEVICE

(71) Applicant: NIPPON SEIKI CO., LTD., Niigata (JP)

(72) Inventor: Yukio Ogasawara, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/782,275

(22) PCT Filed: Apr. 3, 2014

(86) PCT No.: PCT/JP2014/059805
§ 371 (c)(1),
(2) Date: Oct. 2, 2015

(87) PCT Pub. No.: WO2014/163128
PCT Pub. Date: Oct. 9, 2014

(65) Prior Publication Data
US 2016/0048026 A1 Feb. 18, 2016

(30) Foreign Application Priority Data

Apr. 4, 2013 (JP) .................................. 2013-078272

(51) Int. Cl.
*G02B 27/14* (2006.01)
*G09G 5/00* (2006.01)
(Continued)

(52) U.S. Cl.
CPC ........... *G02B 27/0179* (2013.01); *B60K 35/00* (2013.01); *B60K 37/04* (2013.01); *G02B 27/0101* (2013.01);
(Continued)

(58) Field of Classification Search
CPC ............... G02B 2027/013; G02B 2027/014; G02B 27/01; G02B 27/0101
(Continued)

(56) References Cited

U.S. PATENT DOCUMENTS 8,937,765 B2 * 1/2015 Hopf .................. B60R 11/0235
359/443

FOREIGN PATENT DOCUMENTS

JP 2000-137189 A 5/2000
JP 2005-289098 A 10/2005
(Continued)

OTHER PUBLICATIONS

International Search Report PCT/JP2014/059805 dated May 20, 2014 with English translation.

*Primary Examiner* — William Choi
(74) *Attorney, Agent, or Firm* — McDermott Will & Emery LLP

(57) ABSTRACT

Provided is a headup display device which is not liable to generate abnormal sound. The headup display device comprises: a liquid crystal display for emitting display light; a concave mirror for reflecting the display light; and a motor device for rotating the concave mirror. The motor device includes: a motor having a motor shaft projecting from a motor body; a worm connected to the motor shaft and having a spiral groove formed on the outer peripheral surface; and a worm wheel provided with teeth engaging with the spiral groove and transmitting a driving force from the motor to the concave mirror. A hole is formed inside the worm extending in the axial direction of the worm from the end face of the worm near the motor body. A compression coil spring is arranged in the hole for biasing the worm in the direction opposite the motor body and biasing the motor shaft toward the motor body.

3 Claims, 7 Drawing Sheets

(51) Int. Cl.
  *G02B 27/01* (2006.01)
  *B60K 35/00* (2006.01)
  *B60K 37/04* (2006.01)
  *F16H 1/16* (2006.01)
  *F16H 57/021* (2012.01)
  *F16H 57/022* (2012.01)

(52) U.S. Cl.
  CPC ... *G02B 27/0149* (2013.01); *B60K 2350/1004* (2013.01); *B60K 2350/2052* (2013.01); *B60K 2350/352* (2013.01); *F16H 1/16* (2013.01); *F16H 2057/0213* (2013.01); *F16H 2057/0221* (2013.01); *G02B 2027/0159* (2013.01)

(58) Field of Classification Search
  USPC .................................. 359/630, 631; 345/7–9
  See application file for complete search history.

(56) References Cited

FOREIGN PATENT DOCUMENTS

| | | |
|---|---|---|
| JP | 2009-073461 A | 4/2009 |
| JP | 2011-150099 A | 8/2011 |
| JP | 2012-061987 A | 3/2012 |
| JP | 2012-253946 A | 12/2012 |

\* cited by examiner ced reflection member is provided, and the driving means comprising: a stepping motor for generating a rotation driving force by way of energization; a rotary shaft extending to this stepping motor, and in which a lead screw part which is a screw groove is formed on a peripheral face of the rotary shaft; a supporting body made of a metal in a sectional substantial U-shape to fix and support the stepping motor in an immobilized state, and at the same time, to pivot a tip end of the lead screw part; a nut having a screw engagement part threadly engaging with a predetermined part of the lead screw part on an annular inner peripheral face, the nut reciprocally moving along an axial direction of the lead screw part by thrust imparted by rotation of the lead screw part; a guide shaft which is engaged with the supporting body so as to form a parallel state to the lead screw part; and a motive power transmission member in which a pair of abutment faces respectively abutting against both side faces of the nut is formed at a proximal part which is a base part, and a pair of protrusion parts made of a hemispheric shape so as to sandwich a protrusion piece of the reflection member therebetween are formed on a pair of opposite walls protruding forward of the proximal part.

HEADUP DISPLAY DEVICE

CROSS-REFERENCE TO RELATED APPLICATIONS

This Application is the U.S. National Phase of PCT/JP2014/059805 filed Apr. 3, 2014, which claims priority to Japanese Patent Application No. 2013-078272 filed Apr. 4, 2013. The subject matter of each is incorporated herein by reference in entirety.

TECHNICAL FIELD

The present invention relates to a headup display device for projecting display light emitted from a display, to a projection member such as a front glass of a vehicle, and then, displaying a virtual image for an observer.

BACKGROUND ART

Conventionally, as a headup display device of this type, for example, there is known the one described in Patent Literature 1 listed below. The headup display device described in Patent Literature 1 is mainly composed of: a display for emitting display light; a reflection member for reflecting the display light emitted from this display; and a housing for housing the display and the reflection member, and is capable of projecting the display light reflected by the reflection member, to the projection member that is a front glass of a vehicle, through a light transmission part which is formed in the housing, and then, displaying a virtual image for an observer.

In this case, the reflection member is provided with: a concave mirror for reflecting the display light from the display; a mirror holder made of a synthetic resin, the mirror holder being formed in a shape of a substantially flat plate to hold this concave mirror; and position adjustment means for transmitting a motive power to a protrusion piece which is a motive power transmitted part partially protruded and formed toward the outside, and then, turning the mirror holder about a predetermined turning axle to thereby make it possible to adjust an angular position of the mirror holder.

This position adjustment means is mainly composed of driving means which is provided with a stepping motor for generating a rotation driving force by way of energization and a rotary shaft extending to this stepping motor, and in which a lead screw part which is a screw groove is formed on a peripheral face of the rotary shaft; a metallic supporting body made of a sectional substantial U-shape to fix and support the stepping motor in an immobilized state, and at the same time, to pivot a tip end of the lead screw part; a nut having a screw engagement part threadly engaging with a predetermined part of the lead screw part on an annular inner peripheral face, the nut reciprocally moving along an axial direction of the lead screw part by thrust imparted by rotation of the lead screw part; a guide shaft which is engaged with the supporting body so as to form a parallel state to the lead screw part; and a motive power transmission member in which a pair of abutment faces respectively abutting against both side faces of the nut is formed at a proximal part which is a base part, and a pair of protrusion parts made of a hemispheric shape so as to sandwich the protrusion piece of the mirror holder therebetween are formed on a pair of opposite walls protruding forward of the proximal part.

In so far as such structured position adjustment means is concerned, if the lead screw part is driven to be rotated concurrently with driving of the stepping motor, the nut that is threadly engaged with the lead screw part due to the rotation of this lead screw part reciprocally moves along an axial direction, and in synchronism with the reciprocal movement of this nut, for example, in one side face of the both side faces in the nut, in the pair of abutment faces, the thrust acts on one abutment face part on the side abutting against the abovementioned one side face.

Due to the action of the thrust as mentioned above, the motive power transmission member moves (reciprocally moves) along the axial direction in synchronism with reciprocal movement of the nut while the transmission member is guided by a guide shaft. Then, concurrently with the movement of the motive power transmission member, such a motive power as to turn the mirror holder about the turning axle is transmitted to the protrusion piece (motive power transmitted part) that is sandwiched between the pair of protrusion parts included in the motive power transmission member.

This fact means that the mirror holder and the concave mirror held on the mirror holder are turned by a predetermined angle about the turning axle due to the transmission of the motive power to the protrusion piece. In addition, the concave mirror is thus angularly moved, whereby the projection direction of the display light with respect to the front glass is adjusted, and concurrently with this, it is possible to move a position of a virtual image which can be visually recognized by an observer, in a vertical direction of the front glass.

CITATION LIST

Patent Literature

Patent Literature 1; Japanese Unexamined Patent Application Publication No. 2009-73461

SUMMARY OF THE INVENTION

Problems to be Solved by the Invention

However, in the case of the headup display device described in Patent Literature 1, if a stepping motor is driven while the motor is subjected to a rotation driving force, vibration of the stepping motor is sequentially transmitted to a lead screw part which is formed on a peripheral face of a rotary shaft of the stepping motor, a nut threadly engaging with the lead screw part, a motive power transmission member moving in synchronism with reciprocally movement of the nut, and a mirror holder (a concave mirror), and there may be a case in which abnormal sound is generated.

Accordingly, the present invention has been made in order to cope with the problem described previously, and it is an object of the present invention to provide a headup display device which is not liable to generate abnormal sound.

Means for Solving the Problems

A headup display device according to the present invention, comprising; a display for emitting display light; a reflection member for reflecting the display light; and a housing for housing the display and the reflection member, the headup display device projecting the display light that is reflected by the reflection member, to a projection member through a light transmission part which is formed in the housing, and then, providing a display for an observer, wherein driving means for turning and operating the reflection member is provided, the driving means has: a motor which comprises a motor shaft protruding from a motor body; a worm which is coupled with the motor shaft and in which a spiral groove is formed at an outer peripheral part; and a worm wheel which comprises teeth engaging with the spiral groove and transmits a driving force from the motor to the reflection member, wherein, inside of the worm, a hole extending from one end side of the worm that is the motor body side in an axial direction of the worm is formed, and wherein, in the hole, an elastic member biasing the worm toward an opposite side to the motor body and biasing the motor shaft toward the motor body is disposed.

The headup display device according to the present invention, the hole extends in the axial direction so as to reach up to a position at which the spiral groove is formed.

The headup display device according to present invention, inside of the worm, a hollow communicating with the hole at an opposite side to one end side of the worm with respect to the hole, extends in the axial direction.

Advantageous Effect of the Invention

According to the present invention, there can be provided a headup display device which is capable of achieving an intended object and which is not liable to generate abnormal sound.

MODE FOR CARRYING OUT THE INVENTION

Hereinafter, with reference to FIG. 1 to FIG. 8, an embodiment in which the present invention is applied to a headup display device for motor vehicle will be described.

Figure 1:
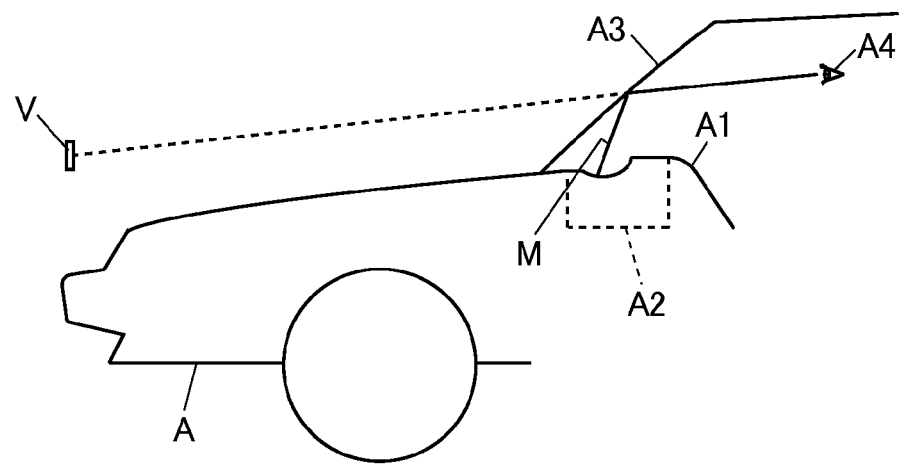
FIG. 1 is a schematic view of a headup display device according to an embodiment of the present invention.

The headup display device, as shown in FIG. 1, is intended to reflect display light M projected by a display device A2 which is a display arranged on an instrument panel A1 of a vehicle A in the direction of a driver (an observer) A4 of the vehicle A on a front glass A3 of the vehicle A, and then, display a virtual image V. In other words, the headup display device is intended to emit (project) the display light M emitted from a display, which will be described later, of the display device A2, to the front glass A3 (the projection member), and then, cause the driver A4 to visually recognize the display image (the virtual image) V that is obtained by this emission. In this manner, the driver A4 can observe the virtual image V while the virtual image is overlapped on a landscape.

Figure 2:
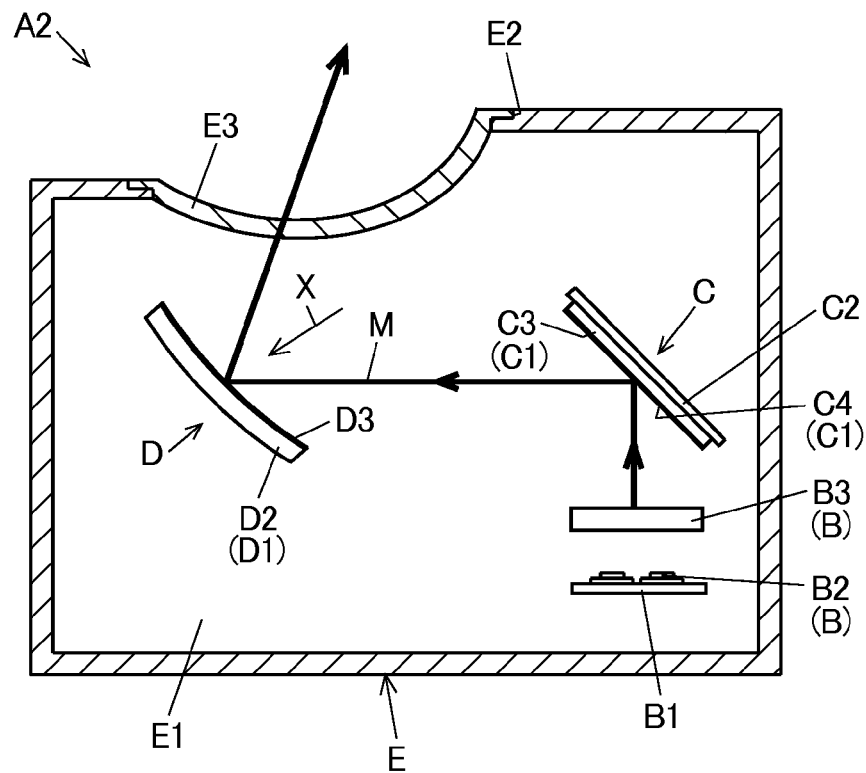
FIG. 2 is a sectional view of the display device according to the embodiment.

The display device A2, as shown in FIG. 2, is mainly composed of: a liquid crystal display (display) B; a first reflector C; a second reflector D; and a housing E.

(Configuration of Liquid Crystal Display B)

The liquid crystal display B is mainly composed of a light source B2 made of a light emitting diode which is implemented (arranged) on a wiring board B1; and a TFT-type liquid crystal display element (a display element) B3 which is positioned on a forward side (top) of the light source B2 so as to transmit illumination light from this light source B2 and then form display light M. This fact means that the light source B2 is arranged at the rear (bottom) part of the liquid crystal display element B3, and the liquid crystal display element B3 emits predetermined information (information to be displayed, which will be described later) as display light M, concurrently with light emission of the light source B2.

Also, the liquid crystal display B is provided in the housing E so that an emission side surface of the display light M opposes to a cold mirror, which will be described later, of the first reflector C, and is fixed and held so that optical axes of the display light M cross each other at a position or in an orientation.

The liquid crystal display element B3 emits and displays information (for example, motor vehicle speed or engine speed) to be displayed by an element driving circuit (not shown) by a numeric value or the like. It is to be noted that, needless to say, as the information to be displayed, any display mode can be employed without being limited to the motor vehicle speed or engine speed as mentioned above.

(Configuration of First Reflector C)

The first reflector C has: a cold mirror C1; a mounting member C2 for mounting and fixing this cold mirror C1. The cold mirror C1 is made of: a substantially rectangular glass board C3 and a reflection layer C4 which is formed on one face of this glass board C3 (the opposite face to the concave mirror, which will be described later, of the second reflector D). This reflection layer C4 is made of a multilayered interference film having a different film thickness, and is formed by a method such as vapor deposition. Also, the cold mirror C1 is arranged in an inclined state at a position such that the display light M emitted from the liquid crystal display B is reflected to the second reflector (the concave mirror).

In addition, in the case of the embodiment, the cold mirror C1 and the liquid crystal display B are respectively arranged at positions at which they cannot be directly seen from a light transmission cover, which will be described later, of the housing E, and is structured such that light from the outside such as solar light (external light) does not directly hit. It is to be noted that the mounting member C2 is made of a black synthetic resin material, for example, and is fixed to the housing E.

(Configuration of Second Reflector D)

Figure 3:
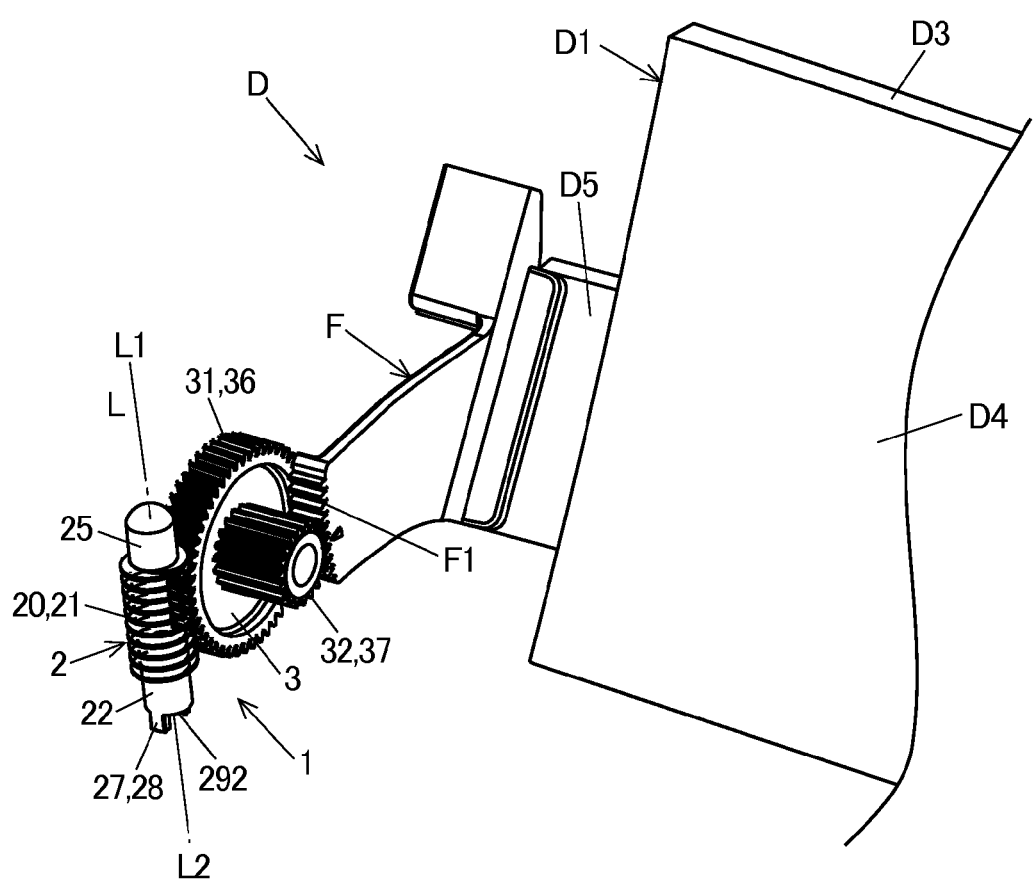
FIG. 3 is a perspective view showing a part of a motor device when seen in the direction indicated by the arrow X and a second reflector in FIG. 2.
Figure 4:
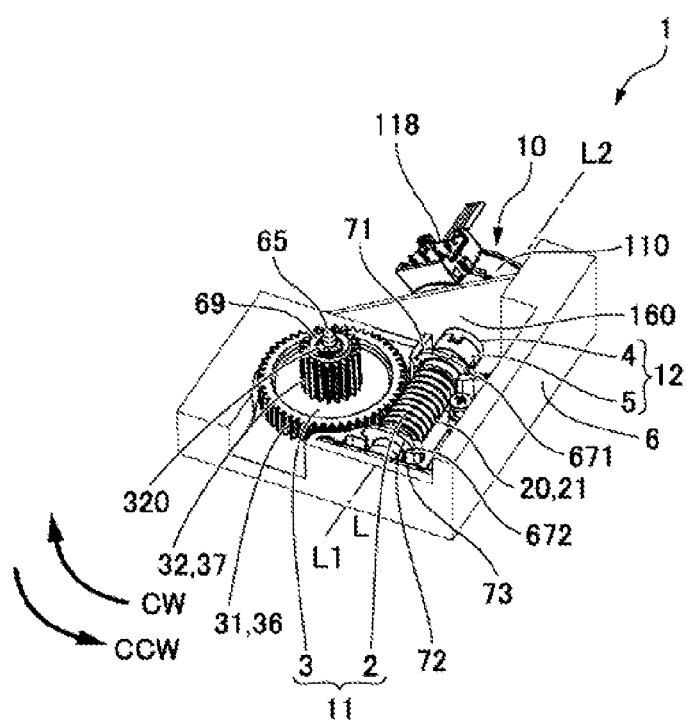
FIG. 4 is a perspective view of the motor device according to the embodiment.

The second reflector D, as shown in FIG. 3 and FIG. 4, is provided with: a concave mirror (a reflection member) D1 which is arranged so as to be inclined in the housing E to reflect the display light M from the cold mirror C1; and a motor device 1 as driving means for generating a driving force for turning and operating this concave mirror D1 (It is to be noted that, in FIG. 3, among the constituent elements of the motor device 1, only a worm and a worm wheel, which will be described later, are illustrated).

The concave mirror D1 is provided with: a board D3 made of a synthetic resin (for example, polycarbonate); and a reflection film D4 made of a metal such as aluminum vapor-deposited and formed on a front face of this board D3 (namely, a face opposing to the reflection layer C4 of the cold mirror C1), and the front face of the board D3 and a rear face of the board D3, positioned at an opposite side to the front face, are both concave-shaped curved faces (concave faces), each of which has a predetermined curvature (refer to FIG. 2).

Therefore, if the reflection film D4 is formed on the front face of the board D3 that is formed as this concave face, the front face of the board D3 is obtained as a light reflection face for reflecting the display light M from the cold mirror C1 toward the light transmission cover. It is to be noted that the concave mirror D1 is arranged in an inclined state at a position at which the front face of the board D3 on which the reflection film D4 is formed (namely, the light reflection face) opposes to the cold mirror C1 and the light transmission cover, and the front face can be seen from the light transmission cover.

In addition, the concave mirror D1 in which the reflection film D4 is formed on the front face of the board D3 is intended to reflect (project) the display light M from the cold mirror C1 to the light transmission cover (the front glass A3 of the vehicle A) while the display light is expanded. This fact means that the concave mirror D1 expands the display light M that is reflected by the cold mirror C1 and then projects the thus expanded display light M on the front glass A3 through the light transmission cover.

It is to be noted that, in FIG. 3, reference numeral D5 designates a substantially flat plate-shaped coupling part which is protruded and formed from a substantial center part of one side face in the board D3 toward a follower member, which will be described later, included in the motor device 1, and this coupling part D5 and the follower member are coupled with, and are fixed to, each other by appropriately employing coupling means.

(Configuration of Motor Device 1)

Figure 5:
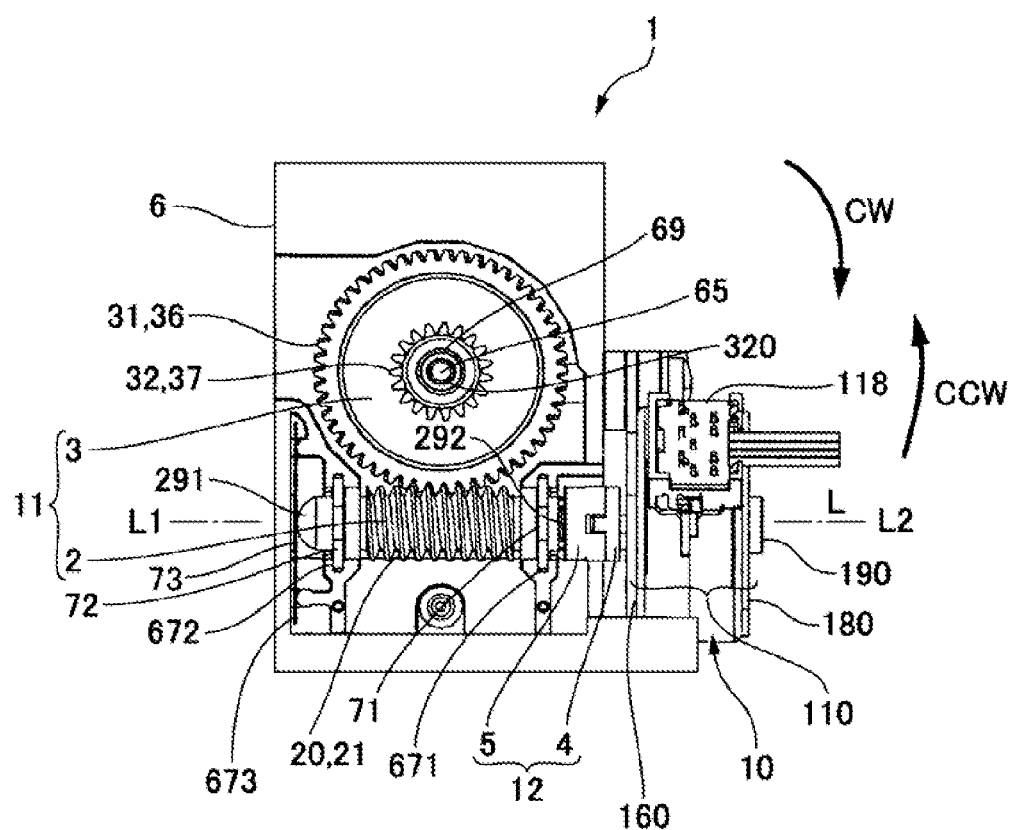
FIG. 5 is a plan view of the motor device according to the embodiment.

The motor device 1 that is driving means, as shown in FIG. 3 to FIG. 5, has: a motor 10 as a driving source; a transmission mechanism 11 to transmit rotation of the motor 10; a follower member F by which the rotation of the motor 10 is transmitted via the transmission mechanism 11; and a frame 6 to which the motor 10 and transmission mechanism 11 or the like are mounted, and is intended to turn and operate the coupling part D5 (the concave mirror D1) that is coupled with, and is fixed to, the follower member F.

The transmission mechanism 11 has: a worm 2 by which the rotation of the motor 10 is transmitted; and a worm wheel 3 threadly engaging with the worm 2 so as to transmit the driving force from the motor 10 to the follower member F (the concave mirror D1).

On an outer peripheral face (an outer peripheral part) 20 of the worm 2, a spiral groove 21 is formed, and at a large diameter part 31 of the worm wheel 3, first teeth (teeth) 36 threadly engaging with the spiral groove 21 of the worm 2 are formed. Also, the worm wheel 3 has a small diameter part 32 which is formed so as to be concentric to the large diameter part 31, and on an outer peripheral face of the small diameter part 32, there are formed second teeth 37 threadly engaging with a gear, which will be described later, included in the follower member F.

At the small diameter part 32, an axial hole 320 with which a supporting shaft 65 erected from the frame 6 engages is formed, and the worm wheel 3 is rotatable about the supporting shaft 65. It is to be noted that, at a tip end part of the supporting shaft 65, a washer 69 is secured, and by the washer 69, slippage of the worm wheel 3 from the supporting shaft 65 is prevented.

The follower member F as mentioned above is formed of a sheet-shaped synthetic resin material, for example, and at a tip end side which is opposite to the coupling part D5, a gear F1 threadly engaging with the second teeth 37 of the worm wheel 3 is provided. The follower member F is actuated in accordance with turning operation of the worm wheel 3 to thereby transmit motive power to the coupling part D5, and concurrently with the transmission of the motive power to the coupling part D5, an angle of inclination of the concave mirror D1 can be varied.

In the motor device 1 as mentioned above, if the rotation of the motor 10 is transmitted to the worm wheel 3 via the worm 2, the worm wheel 3 rotates clockwise CW or counterclockwise CCW about the supporting shaft 65.

Figure 6:
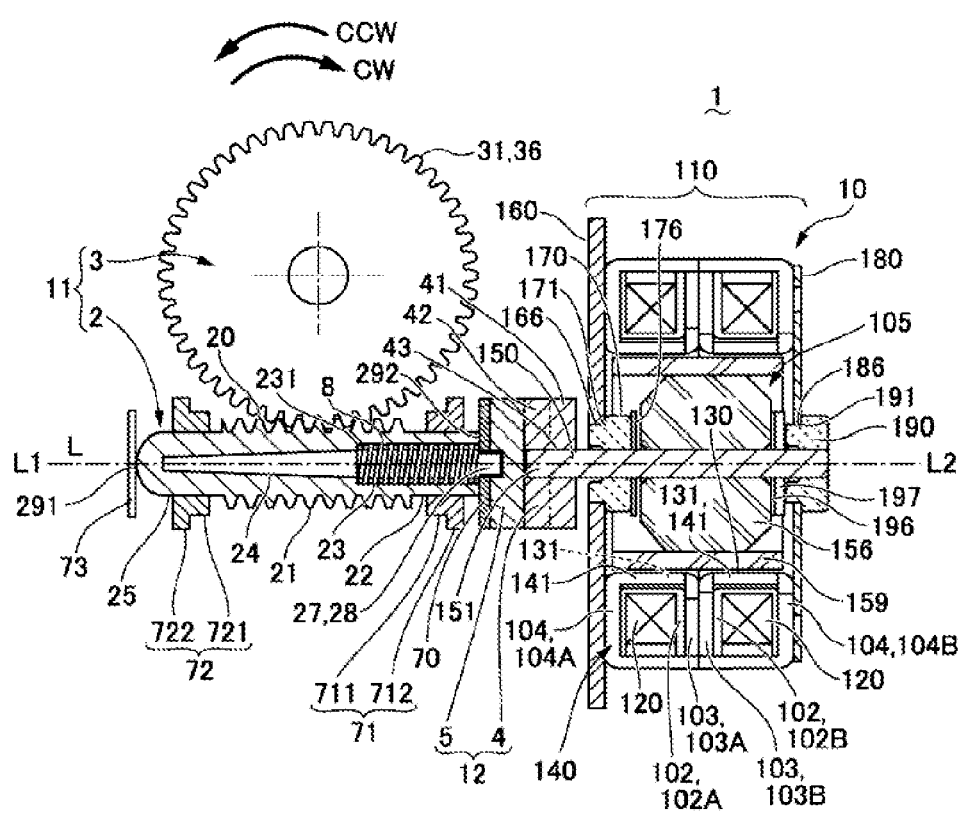
FIG. 6 is a sectional view of the motor device according to the embodiment.

In addition, FIG. 6 shows a sectional view of the motor device 1 in a state in which the follower member F is removed. It is to be noted that, in the following description, in the motor axial direction L, a side at which a motor shaft 150 protrudes from a motor body 110 is defined as an output side L1, and an opposite side to the side at which the motor shaft 150 protrudes from the motor body 110 is defined as an anti-output side L2.

(Configuration of Motor 10)

As shown in FIG. 6, the motor 10 is a stepping motor, and is provided with a motor shaft 150 protruding from a columnar motor body 110. The motor body 110 has a cylindrical stator 140, and the stator 140 is structured such that a stator for phase A and a stator for phase B are disposed so as to overlap with each other in the motor axial direction L.

Thus, in the stator 140, two annular coil bobbins 102 (a first coil bobbin 102A and a second coil bobbin 102B) around which a coil wire 120 are wound up are disposed so as to overlap with each other in the motor axial direction L, and on the coil bobbins 102, an inner stator core 103 and an outer stator core 104 are disposed so as to overlap with each other. More specifically, in the first coil bobbin 102, at both sides of the motor axial direction L, an annular inner stator core 103A and a sectional U-shaped outer stator core 104A are disposed so as to overlap with each other, and in the second coil bobbin 102B, at both sides of the motor axial direction L, an annular inner stator core 103B and a sectional U-shaped outer stator core 104B are disposed so as to overlap with each other.

On inner peripheral faces of the first coil bobbin 102A and the second coil bobbin 102B, a plurality of polar teeth 131, 141 of inner stator cores 103A, 103B and outer stator cores 104A, 104B are configured to be arranged in a peripheral direction. In this manner, a cylindrical stator 140 which is provided with a rotor disposition hole 130 is configured, and inside of a radial direction of the stator 140, a rotor 105 is coaxially disposed.

It is to be noted that, in the embodiment, the outer stator cores 104A, 104B each are formed in a sectional U-shape, and the outer stator cores 104A, 104B respectively extend to the outside of the radial direction of the coil wire 120, and constitute a motor case. Also, at the coil bobbins 102 (the first coil bobbin 102A and the second coil bobbin 102B), a terminal board (not shown) is integrally formed, and a board 118 is connected to a terminal which is held by the terminal board as mentioned above.

In the rotor 105, the motor shaft 150 extends in the motor axial direction L. At a position close to the anti-output side L2 of the motor shaft 150, a cylindrical bushing 156 is securely fixed, and on an outer peripheral face of the bushing 156, a permanent magnet 159 is securely fixed by an adhesive agent or the like. In this state, on an outer peripheral face of the permanent magnet 159, polar teeth 131, 141 of the stator 140 oppose to each other at predetermined intervals.

On the output side L1 with respect to the stator 140, a plate 160 is fixed by a method such as welding, and in the plate 160, there are formed: a hole 166 with which a radial bearing 170 on the output side with respect to the motor shaft 150 engages; and a hole 167 for mounting to the frame 6. In the embodiment, on an outer peripheral face of the radial bearing 170, a stepped part 171 is formed, and the stepped part 171 abuts against a face of the anti-output side L2 of the plate 160, whereby movement of the radial bearing 170 to the output side L1 is restrained.

At the periphery of the motor shaft 150, a circular ring-shaped washer 176 is mounted between the radial bearing 170 and the bushing 156. In the thus configured motor 10, a movable range of the motor shaft 150 to the output side L1 is defined by the radial bearing 170.

At the anti-output side L2 with respect to the stator 140, a plate 180 is fixed by a method such as welding, and in the plate 180, there is formed a hole 186 with which a radial bearing 190 of the anti-output side L2 to the motor shaft 150 engages. In the embodiment, on an outer peripheral face of the radial bearing 190, a stepped part 191 is formed, and the stepped part 191 abuts against a face of the anti-output side L2 of the plate 180, whereby movement of the radial bearing 190 to the output side L1 is restrained.

At the periphery of the motor shaft 150, circular ring-shaped washers 196, 197 are mounted between the radial bearing 190 and the bushing 156, and the washer 197 that is positioned at the anti-output side L2 comes into contact with an end face of the output side L1 of the radial bearing 190. In the thus configured motor 10, a movable range of the motor shaft 150 to the anti-output side L2 is defined by the radial bearing 190.

(Coupling Structure between Motor Shaft 150 and Worm 2)

Figure 7:
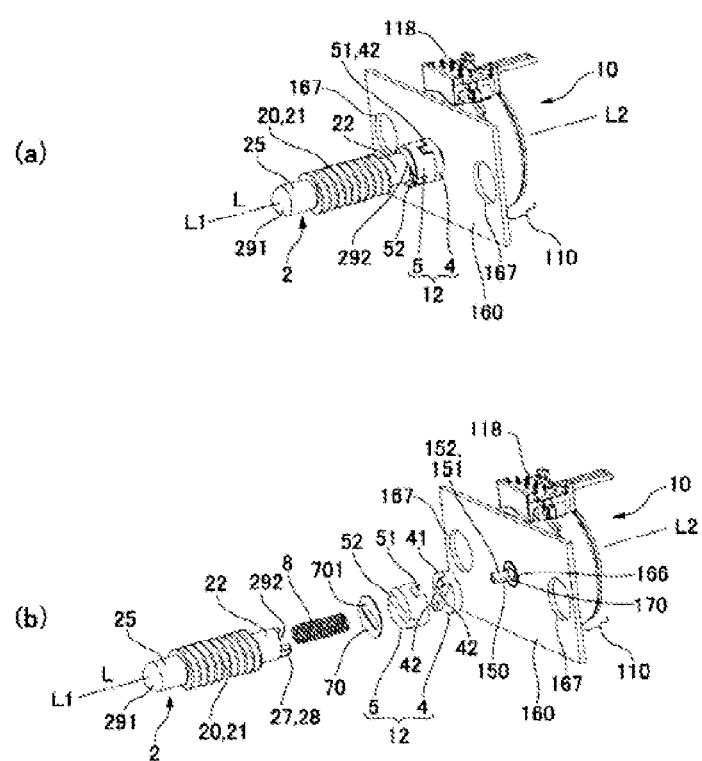
FIG. 7 is a perspective view when a coupling part between a motor and a worm according to the embodiment is seen from an output side of the motor.

FIG. 7 is an illustrative view when a coupling part between the motor 10 and the worm 2 is seen from the output side L1 of the motor 10, in which FIG. 7(*a*) is a perspective view of the coupling part between the motor 10 and the worm 2, and FIG. 7(*b*) is an exploded perspective view of the coupling part between the motor 10 and the worm 2. Also, FIG. 8 is an illustrative view when the coupling part between the motor 10 and the worm 2 is seen from the anti-output side L2 of the motor 10, in which FIG. 8(*a*) is a perspective view of the coupling part between the motor 10 and the worm 2, and FIG. 8(*b*) is an exploded perspective view of the coupling part between the motor 10 and the worm 2.

Figure 8:
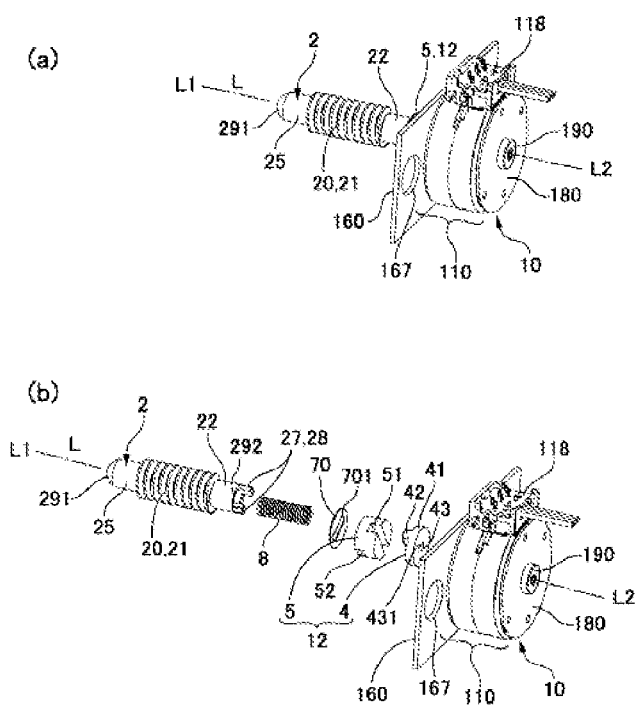
FIG. 8 is a perspective view when the coupling part between the motor and the worm according to the embodiment is seen from an opposite side to the output side of the motor.

The motor shaft 150 of the motor 10 and the worm 2, as shown in FIG. 6 to FIG. 8, are coupled with each other via a coupling 12. More specifically, at an end part 151 which is opposite to the motor body 110 of the motor shaft 150, a driving side coupling 4 is coupled, and at an end part 27 close to the motor body 110 of the worm 2, a follower side coupling 5 to engage with the driving side coupling 4 is coupled, and the motor shaft 150 and the worm 2 are coupled with each other via the coupling 12 (the driving side coupling 4 and the follower side coupling 5).

The driving side coupling 4 is provided with: a disk part 41; and a protrusion part 42 protruding toward an opposite side to the motor body 110 on an opposite face to the motor body 110 of the disk part 41. At a center of the driving side coupling 4, a shaft hole 43 is formed, and in the shaft hole 43, an end part 151 of the motor shaft 150 engages. Here, at the end part 151 of the motor shaft 150, a part of a peripheral direction is obtained as a flat face 152, whereas on an inner peripheral face of the shaft hole 43, a part of the peripheral direction is obtained as a flat face 431, and the flat faces 152, 143 overlap with each other, whereby idling of the driving side coupling 4 and the motor shaft 150 is prevented. It is to be noted that the shaft hole 43 penetrates the disk part 41 and the protrusion part 42, and the protrusion part 42 is divided into two sections in a lengthwise direction by the shaft hole 43.

The follower side coupling 5 is formed in a substantially columnar shape, and on a face at the motor body 110, a first engagement groove 51 with which the protrusion part 42 of the driving side coupling 4 engages is formed all over the radial direction. Thus, a loss exerted when rotation of the driving side coupling 4 is transmitted to the follower side coupling 5 is low. Also, on an opposite face to the motor body 110 of the follower side coupling 5, a second engagement groove 52 with which an end part 27 of the worm 2 engages is formed all over the radial direction. In the embodiment, an extension direction of the first engagement groove 51 and an extension direction of the second engagement groove 52 are displaced with each other by 90 degrees in an angular direction around the axle.

In addition, in the embodiment, inside of the worm 2, a hole 23 which is a spring disposition hole is formed, and the hole 23 as mentioned above opens on an end face (an end side) 292 which is the motor body 110, and extends from the end face 292 of the worm 2 so as to be taken along the axial direction of the worm 2 (namely, the motor axial direction L). Here, on the end face 292 of the worm 2, at two sites which are spaced from each other by 180 degrees in the peripheral direction, protrusion parts 28 protruding toward the motor body 110 are formed, and the two protrusion parts 28 as mentioned above engage with the second engagement groove 52 of the follower side coupling 5. Thus, the loss exerted when rotation of the follower side coupling 5 is transmitted to the worm 2 is low.

In the thus configured motor device 1, if the motor shaft 150 of the motor 10 rotates, the driving side coupling 4 rotates, and the rotation of the driving side coupling 4 is transmitted to the follower side coupling 5 via the protrusion part 42 and the engagement groove 51. In addition, rotation of the follower side coupling 5 is transmitted to the worm 2 via the engagement groove 52 and the protrusion part 28. In the embodiment, the driving side coupling 4 is formed of a resin, and the follower side coupling 5 is formed of a rubber material. Thus, vibration exerted when the motor shaft 150 rotates can be absorbed by the follower side coupling 5.

(Configuration of Worm 2 and Compression Coil Spring 8)

In the motor device 1 of the embodiment, the outer peripheral face 20 of the worm 2 is provided with a spiral groove-free regions 22, 25 in which no spiral groove 21 is formed, on both sides of the motor axial direction L in a region in which the spiral groove 21 is formed, and the worm 2 is rotatably supported by radial bearings 71, 72 in the spiral groove-free regions 22, 25. The radial bearings 71, 72 are respectively provided with: cylinders 711, 721 and flanges 712, 722 of which diameters expand in the cylinders 711, 721, and the flanges 712, 722 are respectively held by grooves 671, 672 of the frame 6 (refer to FIG. 4 and FIG. 5). An end part 291 which is opposite to the motor body 110 of the worm 2 is obtained as a hemispheric face, and the end part 291 of the worm 2 as mentioned above is supported by a plate-shaped thrust bearing 73 which is held in a groove 673 of the frame 6.

In addition, in the embodiment, by utilizing the hole 23 as a spring disposing hole formed in the worm 2, between the worm 2 and the motor shaft 150, there is disposed a compression coil spring (an elastic member) 8 biasing the worm 2 toward the opposite side to the motor body 110 and biasing the motor shaft 150 toward the motor body 110.

More specifically, inside of the worm 2, the hole 23 is obtained as a deep hole extending in the axial direction of the worm 2 (the motor axial direction L) so as to reach a site from the end face 292 close to the motor body 110 of the worm 2 up to a position at which the spiral groove 21 is formed on the outer peripheral face 20, and in the hole 23 as mentioned above, the compression coil spring 8 is disposed (embedded). In this state, one end side of the compression coil spring 8 (the opposite side to the motor body 110) abuts against the stepped part 231 that is formed at the depth of the hole 23, whereas the other end side of the compression coil spring 8 (close to the motor body 110) abuts against the follower side coupling 5.

In addition, at the opposite side to the motor body 110 of the follower side coupling 5, there is disposed a spacer 70 in which a groove-shaped opening part 701 overlapping with the second engagement groove 52 is formed, and the other end side of the compression coil spring 8 (close to the motor body 110) biases the follower side coupling 5 via the spacer 70. As a result, the compression coil spring 8 biases the worm 2 toward the opposite side (output side L1) to the motor body 110, and biases the motor shaft 150 toward the motor body 110 (the anti-output side L2) via the spacer 70 and the coupling 12 (the follower side coupling 5 and the driving side coupling 4). It is to be noted that, in the embodiment, the spacer 70 is formed of a stainless plate.

Here, the worm 2 is formed of POM (a polyacetal resin), for example, and inside of the worm 2, at the opposite side to the end face 292 with respect to the hole 23, a hollow 24 communicating with the hole 23 extends in the axial direction of the worm 2 (the motor axial direction L). Thus, in the worm 2, no excessively thick part is present. It is to be noted that the hollow 24 is formed in a tapered shape on an inner peripheral face thereof, and thus, an inner diameter dimension is successively reduced from a side at which the end face 292 is positioned, as it is spaced from the end face 292. In addition, the compression coil spring 8 that is embedded in the hole 23 is surrounded by the inner peripheral face of the hole 23 at an outer peripheral face thereof, and thus, even if the compression coil spring 8 slackens, the compression coil spring 8 is never displaced to the outside. Therefore, there is an advantage that the biasing direction of the compression coil spring 8 is hardly displaced from the motor axial direction L.

(Configuration of Housing E)

The housing E is made of a black, light-shielding synthetic resin material; is formed in a substantially box-like shape; is intended to hold and house the liquid crystal display B and the first and second reflectors C, D in a space E1 which is an inside space thereof; and is provided with an opening window E2 that opens at a top part (close to the front glass A3) of a position at which the concave mirror Dl is arranged in the second reflector D (refer to FIG. 2).

Also, in the housing E, a light transmission cover E3 which is a light shielding part is arranged so as to close the opening window E2. The light transmission cover E3 as mentioned above is made of a light-shielding synthetic resin material (for example, an acrylic resin); is formed in a curved shape (shaped like a curved face); and has a function as a light transmission member through which the display light M reflected by the concave mirror D1 is transmitted). Namely, the display light that is reflected by the concave mirror D1 is projected on the front glass A3 through the light transmission cover E3 that is formed in the housing E, whereby the virtual image V is displayed for the driver A4.

As described above, in the embodiment, the motor device 1 is provided with: a motor 10 which is provided with a motor shaft 160 protruding from a motor body 110; a worm 2 which is coupled with the motor shaft 150 and in which a spiral groove 21 is formed on an outer peripheral face 20; and first teeth 36 threadly engaging with the spiral groove 21, the motor device having a worm wheel 3 for transmitting a driving force from the motor 10 to the concave mirror D1, and inside of the worm 2, there is formed a hole 23 extending from an end face 292 of the worm 2 close to the motor body 110 in the axial direction of the worm 2, and further, in hole 23, there is disposed a compression coil spring 8 biasing the worm 2 toward the opposite side to the motor body 110 and biasing the motor shaft 150 toward the motor body 110.

Therefore, the position of the axial direction of the worm 2 (the motor axial direction L) can be defined, and when the driving force from the motor body 110 is transmitted to the follower member F (namely, the concave mirror D1) via the worm 2 and the worm wheel 3, the effects of the force in the thrusting direction applied from the worm wheel 3 to the worm 2 can be absorbed by the compression coil spring 8.

More specifically, the compression coil spring 8 biases the motor shaft 150 and the coupling 12 toward the motor body 110 (the anti-output side L2) and thus in a case where the worm 2 drives the worm wheel 3 counterclockwise CCW (or in a case where a pressing force in the clockwise CW direction is applied to the worm wheel 3), although the pressing force to be applied to the output side L1 acts on the worm 2, the effects of the pressing force as mentioned above can be absorbed by the compression coil spring 8. Therefore, a backlash in the thrusting direction hardly arises with the motor shaft 150 or the coupling 12 and thus it is possible to provide a headup display device which is not liable to generate abnormal sound at the time of driving of the motor 10.

Also, the compression coil spring 8 biases the worm 2 toward the thrust bearing 73 that is disposed at the opposite side (the output side L1) to the motor body 110 and thus in a case where the worm 2 drives the worm wheel 3 clockwise CW (or in a case where a pressing force in the counterclockwise CCW direction is applied from the follower member F to the worm wheel 3), although the pressing force to be applied to the anti-output side L2 acts on the worm 2, the effects of the pressing force as mentioned above can be absorbed by the compression coil spring 8. Therefore, it is possible to maintain a state in which the worm 2 and the thrust bearing 73 abut against each other, the backlash in the thrusting direction of the worm 2 hardly arises, and thus, it is possible to provide a headup display device which is not liable to generate abnormal sound at the time of driving of the motor 10.

In addition, in the embodiment, the compression coil spring 8 is disposed (embedded) in the hole 23 as a spring disposition hole leading up to a position at which the spiral groove 21 is formed on the outer peripheral face 20 from the end face 292 close to the motor body 110 of the worm 2, whereby, even in a case where the compression coil spring 8 with a large number of windings is disposed between the motor shaft 150 and the worm 2, the entirety of the compression coil spring 8 is housed in the hole 23 and thus there is an advantage that a space between the motor shaft 150 and the worm 2 can be saved. Namely, although the compression coil spring 8 with a large number of windings is elongated while a sprint constant thereof is stable, as in the embodiment, if the compression coil spring 8 is disposed (embedded) in the hole 23 leading up to the position at which the spiral groove 21 is formed on the outer peripheral face 20, even in a case where the elongated compression coil spring 8 is employed, the space between the motor shaft 150 and the worm 2 can be saved.

Further, in the embodiment, inside of the worm 2, a hollow 24 communicating with the hole 23 at the opposite side to the end face 292 with respect to the hole 23 extends in the axial direction of the worm 2 (the motor axial direction L). Therefore, the worm 2 can be made thin and thus it is possible to restrain lowering of molding precision exerted by a shrink of a resin at the time of molding.

Furthermore, although the embodiment described a configuration in which the entirety of the compression coil spring 8 is housed in the hole 23 of the worm 2 in the motor device 1 employing the coupling 12, for example, there may be employed a configuration in which the entirety of the compression coil spring 8 is housed in the hole 23 of the worm 2 in the motor device 1 that does not employ the coupling 12.

Although the embodiment described a configuration in which the entirety of the compression coil spring 8 is housed in the hole 23 of the worm 2, the hole 23 may reach up to a position at which the spiral groove 21 is formed on the outer peripheral face 20 in the worm 2, for example, there may be a configuration in which a part of the compression coil spring 8 comes out of the hole 23.

INDUSTRIAL APPLICABILITY

The present invention is applicable to a headup display device which is provided with a reflection member such as a concave mirror for reflecting display light from a display, for projecting the display light that is reflected by this reflection member, to a projection member such as a front glass of a vehicle, through a light transmission part which is formed in a housing, and then, providing a display for an observer.

DESCRIPTION OF REFERENCE NUMERALS

1 Motor device (driving means)
2 Worm
3 Worm wheel
4 Driving side coupling
5 Follower side coupling
8 Compression coil spring (elastic member)
10 Motor
11 Transmission mechanism
12 Coupling
20 Outer peripheral face (outer peripheral part)
21 Spiral groove
23 Hole
24 Hollow
36 First teeth (teeth)
110 Motor body
150 Motor shaft
292 End face (one end side)
B Liquid crystal display (display)
D1 Concave mirror (reflection member)
E Housing
E3 Light transmission cover (light transmission part)
F Follower member
F1 Gear
M Display light

The invention claimed is:

1. A headup display device comprising:
a display for emitting display light;
a reflection member for reflecting the display light; and
a housing for housing the display and the reflection member,
the headup display device projecting the display light that is reflected by the reflection member, to a projection member through a light transmission part which is formed in the housing, and then, providing a display for an observer,
wherein driving means for turning and operating the reflection member is provided, the driving means has:
a motor which comprises a motor shaft protruding from a motor body;
a worm which is coupled with the motor shaft and in which a spiral groove is formed at an outer peripheral part; and
a worm wheel which comprises teeth engaging with the spiral groove and transmits a driving force from the motor to the reflection member,
wherein, inside of the worm, a hole extending from one end side of the worm that is the motor body side in an axial direction of the worm is formed, and
wherein, in the hole, an elastic member biasing the worm toward an opposite side to the motor body and biasing the motor shaft toward the motor body is disposed.

2. The headup display device according to claim 1, wherein
the hole extends in the axial direction so as to reach up to a position at which the spiral groove is formed.

3. The headup display device according to claim 1, wherein, inside of the worm, a hollow communicating with the hole at an opposite side to one end side of the worm with respect to the hole, extends in the axial direction.

* * * * *